United States Patent [19]

Lewis et al.

[11] 3,848,235

[45] Nov. 12, 1974

[54] SCAN AND READ CONTROL APPARATUS FOR A DISK STORAGE DRIVE IN A COMPUTER SYSTEM

[75] Inventors: David Otto Lewis; Thomas Howard Miller, both of Rochester, Minn.

[73] Assignee: International Business Machines Corporation, Armonk, N.Y.

[22] Filed: Oct. 24, 1973

[21] Appl. No.: 409,215

[52] U.S. Cl. .......................... 340/172.5, 340/174.1 H
[51] Int. Cl. .......................... G06f 3/06, G06f 13/04
[58] Field of Search .... 340/172.5, 173 RC, 174.1 H

[56] References Cited

UNITED STATES PATENTS

| | | | |
|---|---|---|---|
| 3,431,558 | 3/1969 | Capozzi | 340/172.5 |
| 3,601,808 | 8/1971 | Vlack | 340/172.5 |
| 3,611,314 | 10/1971 | Pritchard et al. | 340/172.5 |
| 3,647,348 | 3/1972 | Smith et al. | 340/172.5 X |
| 3,648,255 | 3/1972 | Beausoleil et al. | 340/172.5 |
| 3,668,647 | 6/1972 | Evangelisti et al. | 340/172.5 |
| 3,689,891 | 9/1972 | Kril | 340/172.5 |
| 3,781,812 | 12/1973 | Wymore et al. | 340/172.5 |
| 3,792,442 | 2/1974 | Koeijmans | 340/172.5 |

*Primary Examiner*—Gareth D. Shaw
*Assistant Examiner*—Melvin B. Chapnick
*Attorney, Agent, or Firm*—Donald F. Voss

[57] ABSTRACT

Control apparatus for controlling a disk storage drive attachment in a computer system whereby records stored on the disk storage media are scanned and read within the same data field. The search key or search argument contained in main storage of the computer system is retrieved and compared with the key in the disk data field being scanned. The storage locations in the scan field not containing the search key are set to hexidecimal FF. The central processing unit (CPU) of the computer system is in a write to disk storage drive mode whereby the search argument is transferred from storage to the disk storage drive attachment as data is read from the disk storage drive. Decode apparatus senses the first hexidecimal FF from storage and switches the operation from a scan mode into a read mode and if a scan low or equal condition resulted from the comparison, the disk data field is read into the storage scan field with one byte of FF between the search key in storage and the newly stored disk data. The one byte of FF still provides an indication of the end of the search key. The operation then switches back to the scan mode and repeats in the manner described, i.e., sequential disk data fields are read into the storage scan field, until a comparison of equal or high results. When a high condition exists, a latch is set to block the storage of disk data in main storage because the storage scan field now contains the disk data field which had been sought, i.e., the one containing the desired index key.

13 Claims, 7 Drawing Figures

SCAN AND READ CONTROL APPARATUS FOR A DISK STORAGE DRIVE IN A COMPUTER SYSTEM

BACKGROUND OF THE INVENTION

1. Field of the Invention

This invention relates to control circuitry in a computer system and more particularly to control circuitry for controlling input/output operations in a computer system and still more particularly for controlling the scanning and reading of data fields on disk media in a disk storage drive.

2. Description of the Prior Art

In the past it has been the practice to have a separate key field and data field with a gap therebetween so as to facilitate switching from a scan mode when scanning the key field to a read mode for reading the data field. The separate key field and gap wastes recording space. By eliminating the separate key field and gap the data recording capacity is increased significantly. This increase in recording capacity; however, in the past has resulted in lower system performance. This is because when performing a scan operation, the search argument or key is compared only with the first key in the data field of one record. If the comparison is low, the search argument or key is then compared with the first key in the data field of the next record. If the comparison is high or equal then the key being sought must have been in the data field of the previous record or in the record just scanned and another revolution is required before the desired key can be read.

This invention provides for switching from a scan mode to a read mode within a data field whereby the desired key is read within the same revolution. Hence, the invention improves system performance considerably.

SUMMARY OF THE INVENTION

The principal objects of this invention are to provide improved apparatus for combining scan and read functions to enhance computer systems performance by eliminating disk storage rotational delays where the records on the disk media do not have a separate key field with a gap between the key and data fields. The invention provides a relatively inexpensive combination of apparatus for combining the scan and read functions.

The objects of the invention are achieved by providing decode apparatus for detecting a hexidecimal FF transferred from the scan data field in main storage to the disk storage drive attachment. The scan data field in main storage contains the search key at the head of the field and the remainder of the field is filled with hexidecimals FF. The scan operation takes place by transferring the scan data field from main storage a byte at a time and comparing the search key from main storage with the key in the disk data field. The comparison takes place until the disk storage drive detects a hexidecimal FF byte. This indicates that the comparison operation is complete and sets the operation from a scan mode into a read mode whereby if the key of the disk data field compares low or equal to the search key, the remaining bytes in the disk data field are transferred into the scan data field in main storage with one byte of hexidecimal FF between the search key in the scan field and the newly transferred bytes from the disk data field. This one byte of FF functions to absorb the switching time for changing from a scan to a read mode and it still delineates the end of the search key.

The operation returns to the scan mode and if the first key of the next disk data field compares low or equal to the storage search key, the remaining bytes in the disk data field are transferred into the storage scan field to overlay the bytes transferred from the previous disk data field. If the first key in the next disk data field compares high to the storage search key, the operation still switches from the scan to the read mode but the remaining bytes in the disk data field are blocked from entering main storage. This blocking action takes place because the key being sought from the disk data fields must already be in the scan field in main storage.

DESCRIPTION

Figure 1A:
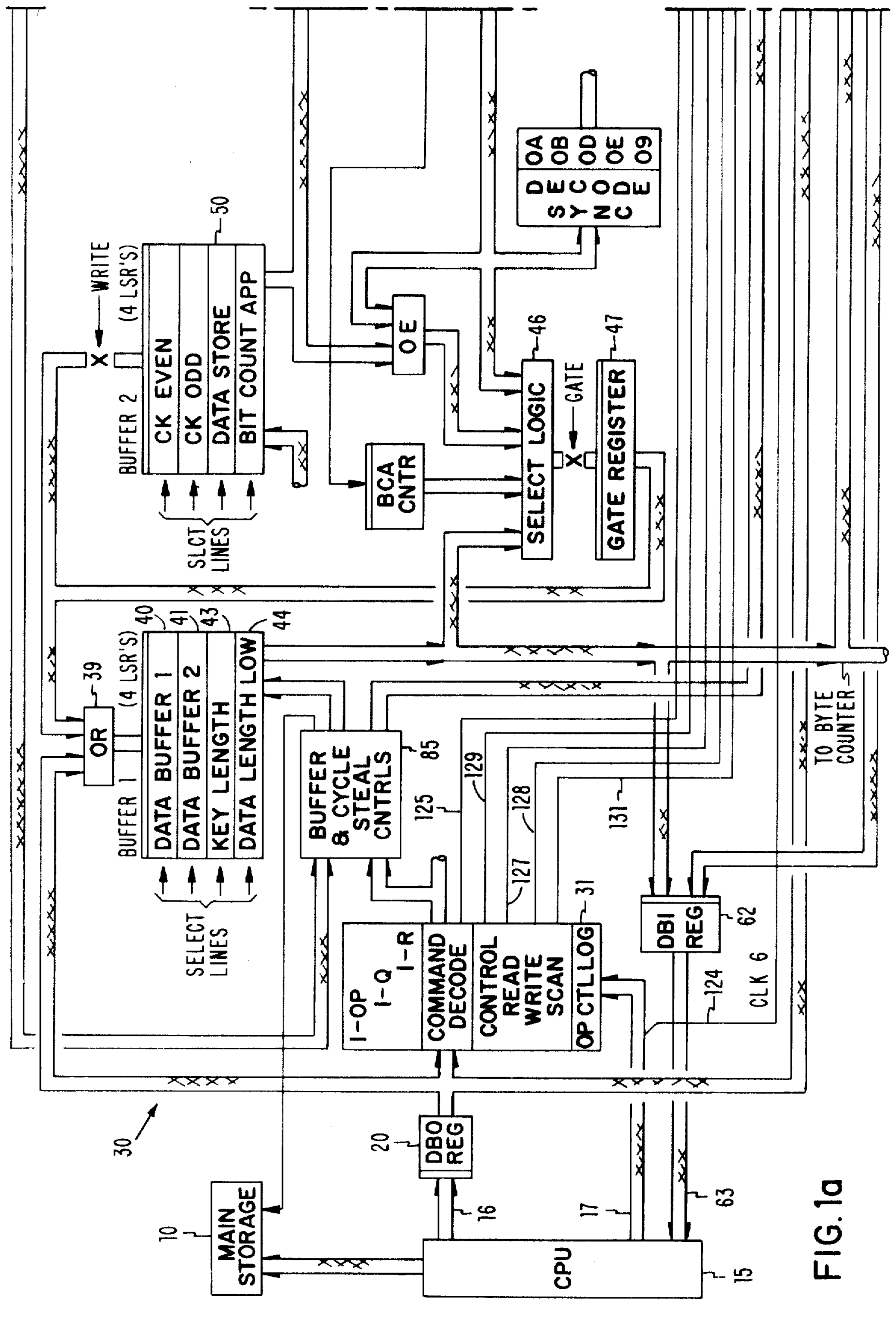
FIGS. 1*a* and 1*b* taken together with FIG. 1*a* disposed to the left of FIG. 1*b* represent a schematic block diagram of the invention incorporated in a computer system.
Figure 1B:
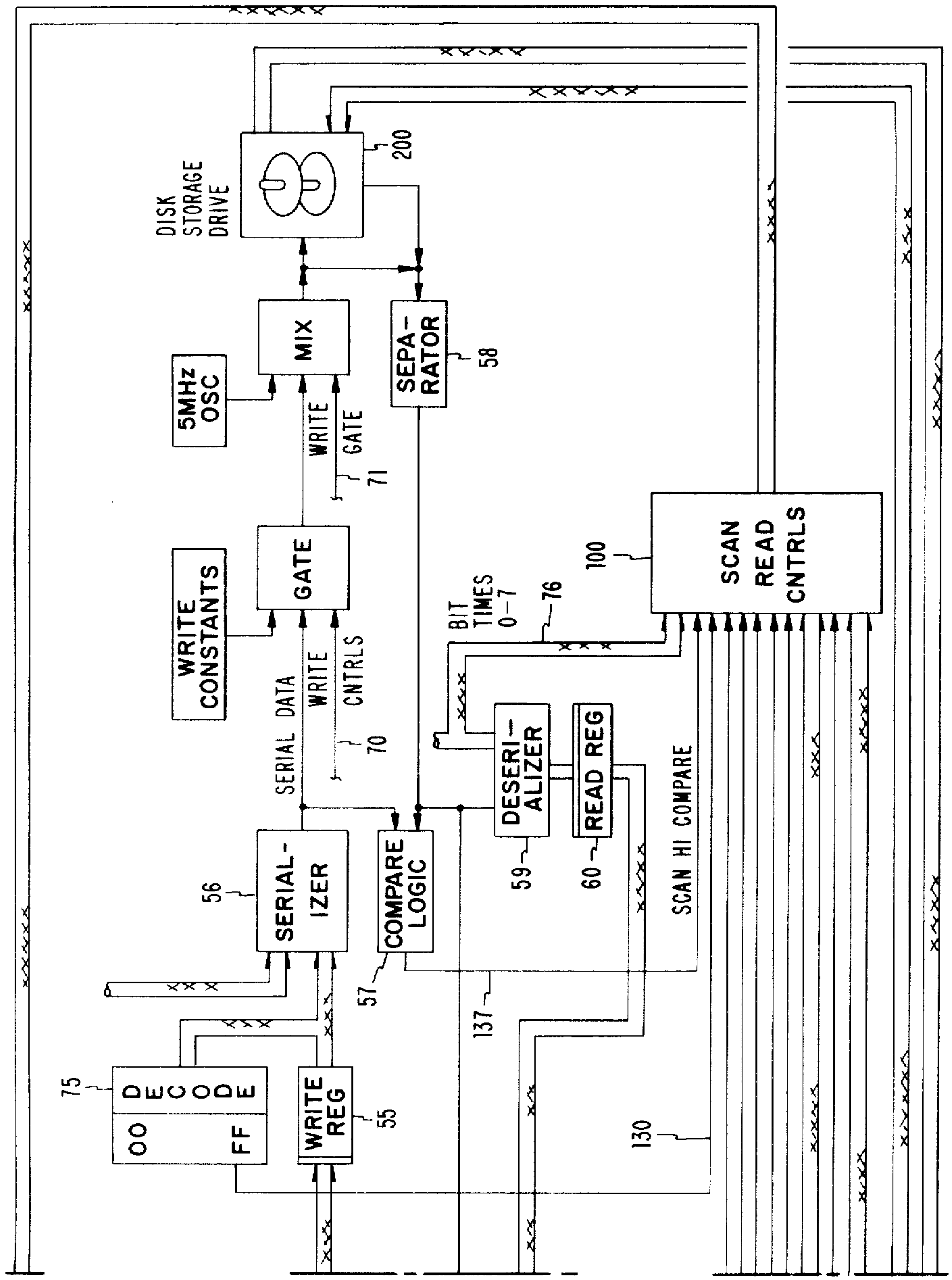

The invention by way of example is shown in FIGS. 1*a* and 1*b* as being incorporated into a computer system of the type shown and described in the IBM 5410 Processing Unit Theory of Operation Manual, SY3-1-0207-2, copyrighted by International Business Machines Corporation, 1971 which is incorporated herein by reference. FIGS. 1*a* and 1*b* are substantially a modification of the drawing shown on page 2-015 of the IBM 5445 Disk Storage Drive Attachment for System/3 Theory — Maintenance Diagrams Manual, SY31-03-11-0 copyrighted by International Business Machines Corporation, 1972, which is also incorporated herein by reference. The IBM System/3 Model 10 Components Reference Manual, GA21-9103-4 copyrighted by International Business Machines Corporation, 1969, 1970, 1971, 1972, 1973, describes the hexidecimal number system referred to in the present invention.

The scan read controls 100 in FIG. 1*b* provide for both scanning and reading a disk data field during a single revolution of the disk in the disk storage drive 200. The scan read controls 100 are part of the I/O attachment 30 which attaches the disk storage drive 200 to the computer system consisting of main storage 10 and central processing unit (CPU) 15.

The scan and read operation is initiated when the CPU encounters a scan read instruction. The scan read instruction is an I/O instruction having an op code of hexidecimal F3. The specific form of the I/O instruction is shown on page 3-015 of the IBM 5445 Disk Storage Drive Attachment for System/3 Manual. The Q byte will be either hexidecimal CB or C3 depending upon whether the M bit, i.e., bit 4 of the Q byte is a zero or one. If bit 4 is a zero, the removable disk drive is selected and if it is a one, the fixed disk drive is selected. Bits 5–7 inclusive of the Q byte are 011 respectively, to represent the scan field. Bit 4 of the R byte of the instruction must be a one to indicate that the operation is a scan read operation.

The Q byte and R byte are transferred successively from CPU 15 over Data Bus Out 16 to DBO register 20. The contents of the DBO register 20 are decoded by operation control logic in block 31.

Figure 3:
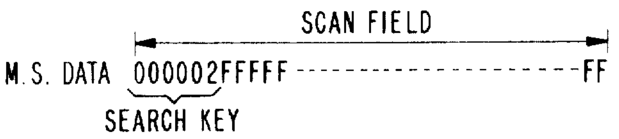
FIG. 3 is a diagram illustrating the scan field in main storage at the start of the scan and read operation.
Figure 5:
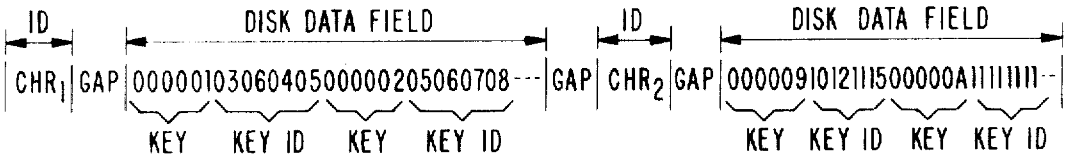
FIG. 5 is a diagram illustrating adjacent disk data fields.

During a scan read operation, main storage 10 is set up with a scan field as shown in FIG. 3. In this particular instance the search key in the scan field consists of three bytes. A byte consists of 8 binary bits which are grouped together to represent data in either binary or hexidecimal form. These terms are well known in the art and are described in more detail in the aforementioned manuals. The search key can take any form and in this instance is represented by numeric characters 000002. This number, for example, could represent a customer identification number and the task would be to locate the data on disk file 200 which relates to that customer number. Disk file 200 has a master file index set forth in the form shown in FIG. 5. The keys in the master file index are numbered sequentially and the key ID associated with the key indicates the location of the data on the disk in the disk storage drive 200. Hence, in this instance, the search key in the scan data field is used for locating the desired key in the master index file. Upon finding the proper key in the disk data field, the key and the associated key ID are read into the scan field in main storage 10. This enables the issuance of instructions for retrieving data from the disk storage drive 200 at the location specified by the key ID which is now in storage.

Initially, the scan data field is set up with the search key at the head of the scan field followed by bytes of hexidecimal FF. Data is transferred from main storage 10 to the CPU 15 and from there via Data Bus Out 16 to DBO register 20 one byte at a time. Thus, the first byte of data transferred from the scan field in main storage 10 enters DBO register 20 and from there it transfers via OR circuit 39 to Data Buffer 1 represented by reference character 40. A second byte of data is transferred in a similar manner to Data Buffer 2 represented by reference character 41. The transfer of the first two data bytes is under control and at the request of the attachment 30 and takes place prior to the serializing of data from the field of data being read in from the disk storage drive 200. The transfer of the first two bytes of data thus takes place while the read head of the disk storage drive 200 is in the gap area, FIG. 5, preceding the disk data field.

The byte of data in Buffer 40 is transferred to Data Store register 50 via Select logic 46 and Gate register 47 just prior to reading the first byte of data from the disk data field. The byte of data in Data Store register 50 is then transferred to Write register 55. It should also be noted that during this transfer another byte of data, i.e., the third byte of data is fetched from main storage 10 and transferred to Data Buffer 40. Also, after the byte in Data Storage register 50 has been transferred to Write register 55 and the compare operation has started the second byte of data in register 41 is transferred to Data Store register 50.

The compare operation takes place by simultaneously reading the byte of data in register 55 to Serializer 56 and reading data bit by bit from disk storage drive 200 to Separator 58. The Separator 58 functions to shape the data bits coming from the disk storage drive 200 and passes the data bits to Compare logic 57 where they are compared serially with data bits from Serializer 56. After the last bit of the first byte of data in Write register 55 has been serialized and compared with a bit from the disk storage drive 200, the results of the compare operation are stored in Compare logic 57 and the second byte of data which is in Data Store register 50 is transferred to Write register 55. Data Store register 50 is then loaded with the third byte of data from register 40. Register 41 has already been loaded with a fourth byte of data from the scan field in main storage 10. Then as previously described, the compare operation starts and Buffer 40 is loaded with the fifth byte of data. The compare operation takes place in the same manner as previously described and the results thereof are stored in Compare logic 57.

The operation just described continues until a hexidecimal FF is detected in the Write register 55. However, when the first hexidecimal FF enters DBO register 20, it is detected by the scan read controls 100. This detection is accomplished by AND circuit 108 in FIG. 2. AND circuit 108 detects when the bits in DBO register 20 are all ones and is gated by a Data Cycle Generate signal on conductor 122 and a Pull Mode signal on conductor 123. The Data Cycle Generate signal is developed within attachment 30, see page 8–205 of the IBM 5445 Disk Storage Drive Attachment for System/3 Manual and indicates that the attachment has requested a cycle steal from CPU 15 and that the cycle steal has been granted and a byte of data is in the process of being transferred to the attachment 30. The Pull Mode signal is shown on page 8–085 of the IBM 5445 Disk Storage Drive Attachment for System/3 Manual and it indicates that attachment 30 is pulling or asking for bytes of data from main storage 10 via CPU 15. Although attachment 30 is in the Pull Mode and data is available for being written onto the disk in the disk storage drive 200, the Write Controls and Write Gate signals on conductors 70 and 71 are not present and therefore no data is being written on the disk. In fact, as previously mentioned, data is being read from the disk to Separator 58. Reading takes place when the Write Gate is not present.

The output of AND circuit 108 indicating the detection of hexidecimal FF conditions AND circuit 105 which also receives an input from AND circuit 103. AND circuit 105 controls the setting of Scan Read FF latch 107. Thus, this latch will be set when the input conditions to AND circuits 103 and 108 have been met. AND circuit 103 receives a clock 6 signal from CPU timing bus 17 in FIG. **1*a*. It also receives the set output of Scan Read latch 102 and a Data Time signal on conductor 125** from attachment 30, see page 8–045 of the IBM 5445 Disk Storage Drive Attachment for System/3 Manual. The Data Time signal is a timing signal which starts at the end of CHR IO field, FIG. 5, and ends at the end of the disk data field.

The Scan Read latch 102 is set under control of AND circuit 101. This AND circuit receives a bit 4 signal from DBO register 20 on conductor 126. A SIO IR Sample signal is passed by conductor 127 to AND circuit 101. The SIO IR Sample signal comes from operation controls 31 and indicates that an IR cycle is taking place. AND circuit 101 also receives a Scan Op signal on conductor 128. The Scan Op signal results from decoding the N bits of the Q byte, see page 3–065 of the IBM 5445 Disk Storage Drive Attachment for System/3 Manual.

From the foregoing, it is seen that the Scan Read FF latch 107 is set when in the scan read operation, i.e., after the Scan Read latch 102 has been set and AND circuit 108 has detected the first FF byte placed into DBO register 20 when operating in a pull mode. Of course, since the FF byte was put in the DBO register 20, it is also transferred to one of the Data Buffers 40 or 41, depending upon which buffer is in condition for receiving it. The hexidecimal FF byte of data is then transferred from the Data Buffers 40 or 41 to the Data Storage register 50 and from there to Write register 55 in the same manner as previously described for other bytes of data. When the Scan Read FF latch 107 is set, it is necessary to inhibit transfer of a byte of data from the scan field to DBO register 20 and to inhibit incrementing the scan field address in the DDDR register in the CPU 15. It is important not to change the address in the DDDR because the byte of data coming from the disk data field must be transferred to the scan field in main storage at the address in the DDDR which is the byte position adjacent to the first byte of hexidecimal FF. The signal for inhibiting the transfer of the next byte from the scan field is the Scan Read FF signal from latch 107 which is applied to inverter 145. This causes AND circuit 146 to be de-conditioned. AND circuit 146 receives a Cycle Request 1 signal from Buffer and Cycle Steal Controls 85 and its output is a Cycle Req 1 signal. The Cycle Req 1 signal is the signal which causes a transfer of a byte of data from main storage 10 to the Data Buffers 40 or 41. The Scan Read 1st FF signal also inhibits the incrementing of the Address in the DDDR because no cycle steal is taken.

In order to prevent an over run condition, it is necessary to prevent the cycle steal logic in controls 85 from indicating that insufficient cycle steals requests have occurred. A dummy cycle steal request is generated and sent to the Buffer Controls and Cycle Steal Controls 85. The logic for generating the dummy cycle steal request includes AND circuit 147 which controls the setting of Dummy Cycle Steal latch 148. AND circuit 147 has inputs for receiving the Cycle Request 1 signal, the Scan Read 1st FF signal and a clock 3 signal. The output of latch 148 is applied to OR circuit 150 which also has an input for receiving the Data Cycle Generate signal. The output from OR circuit 150 is a signal applied to Buffer and Cycle Steal Controls 85 for indicating that Buffers 40 and 41 are full. Latch 148 is reset by the output of OR circuit 149. OR circuit 149 receives a clock 7 signal and a not Data Time Signal.

Figure 2:
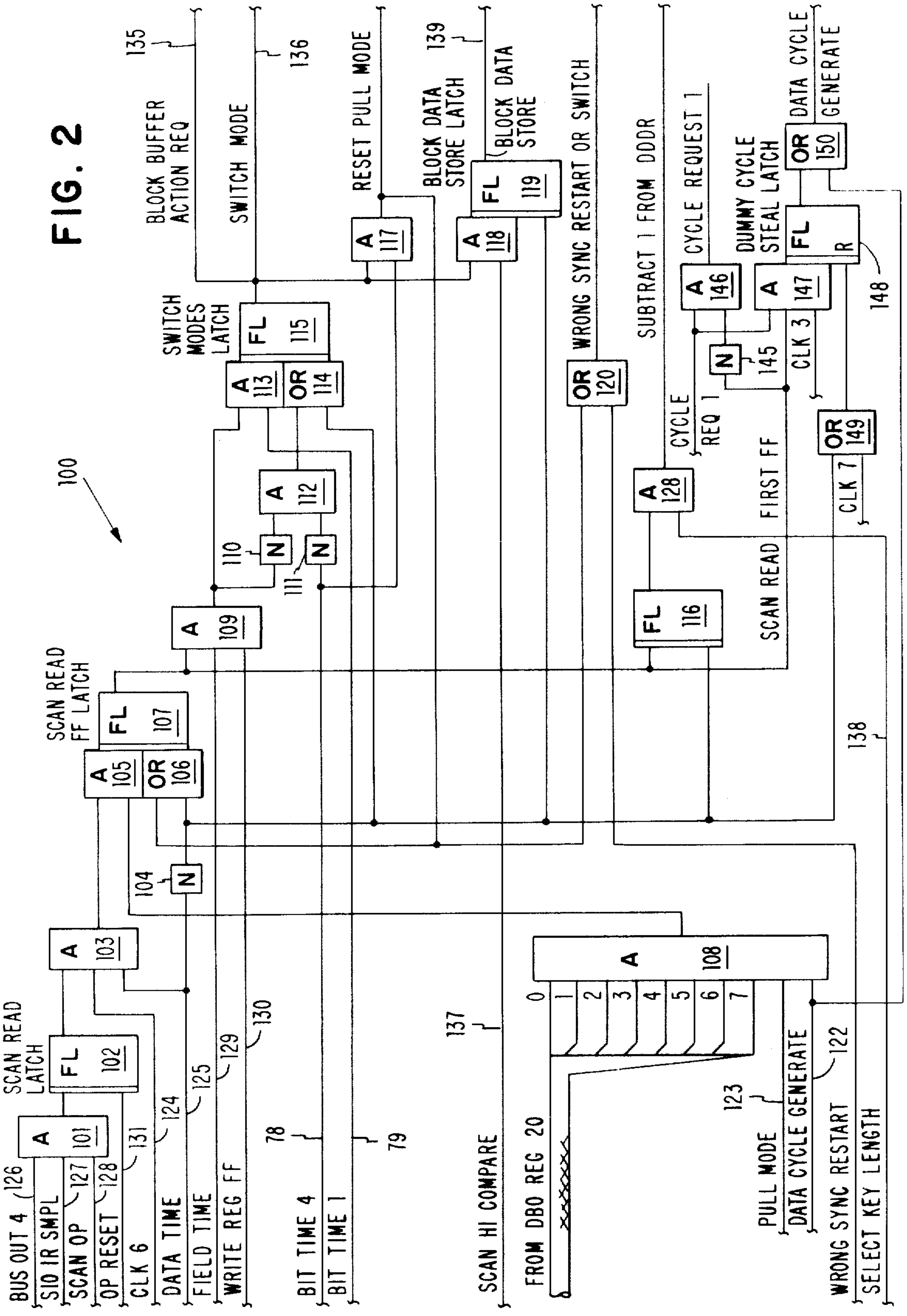
FIG. 2 is a schematic logic diagram illustrating the scan and read controls which are shown in block form in FIG. 1*b*.

Decode logic 75 detects when the hexidecimal FF byte of data is in the Write register 55. The decode logic 75 in response to detecting the hexidecimal FF byte of data in Write register 55 generates a Write Reg FF signal on conductor 130 which is applied to AND circuit 109 in FIG. 2. AND circuit 109 is also connected to receive the set output of the Scan Read FF latch 107 and a Field Time signal on conductor 129. The Field Time signal is a timing signal coming from attachment 30, see page 8–045 of the IBM 5445 Disk Storage Drive Attachment for System/3 Manual. AND circuit 109 provides a signal which is used for switching from a scan mode, i.e., a pull mode into a read mode, i.e., a push mode. The signal from AND circuit 109 is applied to AND circuit 113 which controls the setting of the Switch Modes latch 115. AND circuit 113 is gated or conditioned by a Bit Time 1 signal which comes from attachment 30 over Bit Times bus 76, FIG. 1*b*. The bit time 1 signal in FIG. 2 is shown as being applied to conductor 79 which forms a part of bus 76.

The set output of latch 115 is used for several purposes. First, it is used to block buffer action request by providing a Block Buffer Action Req signal over conductor 135 to Buffer and Cycle Steal Controls 85 of FIG. 1*a*. The signal on conductor 135 causes the Buffer and Cycle Steal Controls 85 to generate a signal for preventing the transfer of data from either Data Buffer 40 or 41 to the Data Store register 50. This action is necessary to prevent a data over run condition in the Buffer Control Logic 85.

Before the deserialized byte of data is transferred, it is necessary to reset Pull Mode. The reset signal for the Pull Mode is passed by AND circuit 117 which is connected to the set output of latch 115 and also receives a Bit Time 4 on conductor 78. The Reset Pull Mode signal from AND circuit 117 is also passed by OR circuit 120 as a Wrong Sync Restart or Switch signal for resetting a serialize latch, see page 8–080 of the IBM 5445 Disk Drive Attachment for System/3 manual to stop the serializing operation and stopping the compare operation in the attachment 30. The Deserialize latch in the Select logic 46 of attachment 30 is set when attachment 30 receives a Switch Mode signal on conductor 136, i.e., when Switch Modes latch 115 is set. The set output of latch 115 is also applied to AND circuit 118 which controls the setting of the Block Data Store latch 119. However, AND circuit 118 is conditioned only when Compare logic 57 provides a scan high compare signal on conductor 137. In this instance, the results of the compare operation are such that the scan high compare signal is not generated.

The Reset Pull Mode signal from AND circuit 117 is also used to reset the Scan Read FF latch 107 via OR circuit 106. However, it should be noted that before latch 107 was reset latch 116 was set. The set output of latch 116 is applied to AND circuit 121 which also receives a Select Key Length signal on conductor 138. The Select Key Length signal comes from Buffer and Cycle steal controls 85, see page 8–215 of the IBM 5445 Disk Storage Drive Attachment for System/3 Manual. The output of AND circuit 121 provides a Subtract 1 from Disk Drive Data Register (DDDR) which is a local store register in CPU 15. The Subtract 1 from the Disk Drive Data Register (DDDR) is used to cause proper addressing of the scan field in main storage 10. The additional decrement is necessary because of one hexidecimal FF byte which is used to separate the search key from the disk data field which is placed in main storage in a manner which will now be described.

With the operation switched from the Pull Mode into the Read Mode and with the Deserialize Latch in Buffer and Cycle Steal Controls 85 set, a deserialized byte of data is transferred from Deserializer 59 to Read Register 60 and from there through Select logic 46, register 47 to Data Buffers 40 or 41. The byte of data is then transferred from data buffer 40 or 41 to DBI register 62. The byte of data in DBI register 62 is then transferred to main storage 10 via Data Bus In 63 and CPU 15 at a location specified by the address in the DDDR register. Successive deserialized bytes of data are transferred in a similar manner.

The number of bytes transferred is determined by the value in the Data Length register 44 during the time the ID field was being read by the disk storage drive 200. Each time that a byte of data is transferred into main storage 10, the value in a counter in the Buffer and Cycle Steal controls 85 is decremented by 1. The operation continues until the entire disk data field is transferred into main storage 10. The data transfer is complete when the Data Time signal on conductor 125 is no longer present. This causes inverter 104 to provide a signal for resetting latch 107 via OR circuit 106, for resetting latch 115 via OR circuit 114 and for resetting latches 116 and 119. Latch 102 is not reset at this time because the scan read operation is not complete. The scan read operation is not complete until a scan high condition has been detected or other predesignated conditions have come into being.

Figure 4:
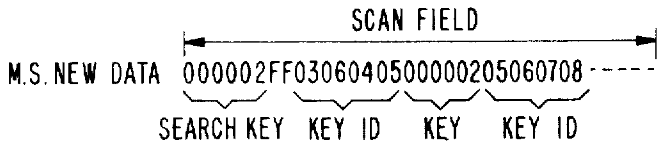
FIG. 4 is a diagram illustrating the scan field in main storage during the scan and read operation and after the disk data field has been transferred into the scan field.

The operation again switches into a pull mode during the gap time preceding the next disk data field. The operation then continues in a manner as previously described. If the results of the compare operation still do not provide a scan high compare signal on conductor 137 in FIG. 2, the newly transferred data would be entered into main storage 10 so as to overlay the data which had been entered into the scan field from the previous disk data field. With reference to FIGS. 3 and 4, it should be noted that the search key in the scan field is separated by a byte of hexidecimal FF from the disk data field which has been entered into the scan field. This byte of hexidecimal FF continues to indicate that the compare operation is to no longer take place and provides the necessary signals for conditioning AND circuit 108 so as to initiate the switching from the pull mode into a read mode as previously described. When the compare logic 57 eventually indicates a scan high condition, latch 119 is set and although data is transferred to main storage 10 in a manner as previously described, it is not entered into main storage 10 because the block data storage signal on conductor 139 prevents data from being written into main storage 10.

Figure 6:
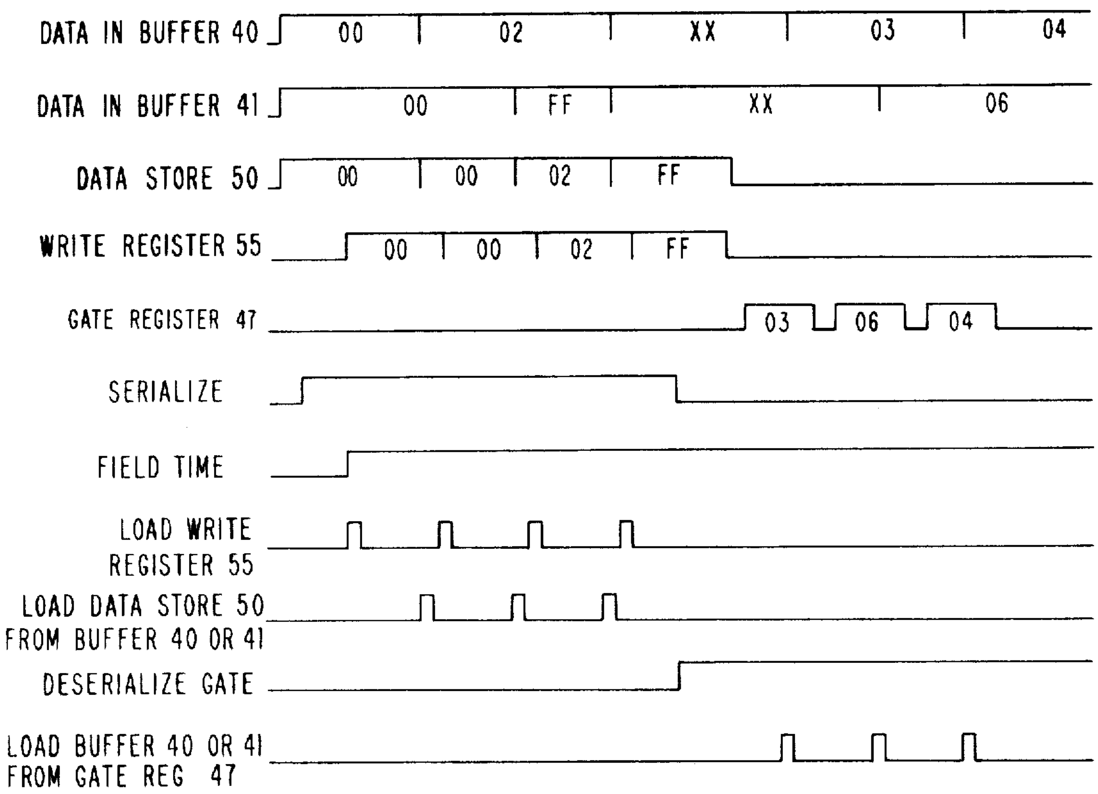
FIG. 6 is a timing diagram.

The timing diagram in FIG. 6 illustrates that data buffer 40 was initially loaded with the first byte of data hexidecimal 00 and then with the third byte of data hexidecimal 02. Thereafter, data buffer 40 is loaded with data which is represented by XX or a don't care condition until the Deserialize gate comes up and then it loaded with a byte from the disk data field; i.e., the first byte of the key ID field. Thereafter, data buffer 40 is loaded with every other byte in the disk data field represented in FIG. 5. Similarly, data buffer 41 is loaded with a hexidecimal 00 which is the second byte of the search key in the scan field. The next byte to be loaded into data buffer 41 is hexidecimal FF. Data buffer 41 is then loaded with bytes represented by XX which indicates that they are not of significance during the serialize operation. However, when switching into the read mode, the Deserialize gate is present and the second byte of the key ID field in the disk data field, i.e., hexidecimal 06 is entered into data buffer 41.

The Data Store register 40 and the Write register 55 are loaded with bytes of data from the scan field in main storage 10 as shown. This takes place during the scan operation. The gate register 47 is loaded when the operation switches to a read mode. The Gate register 47 is loaded with bytes of data from the disk data field. The remaining signals in the timing diagram are signals for controlling the serialize operation, the field time signal, the load Write register control signal, the load Data Store register 50 from buffers 40 or 41 signals, the Deserialize gate signal and the load buffers 40 or 41 from gate register 47 signals.

From the foregoing it is seen that the invention combines scan and read operations within a disk data field. A search key and a distinguishing pattern are placed in the scan field whereby after sensing the search key and upon sensing the distinguishing pattern an indication is provided for switching from the scan mode into the read mode. During the read mode, the data from the disk data field is then transferred to main storage and is entered therein only if the key of the disk data field compares low or equal to the search key of the scan field. If the key in the disk data field compares high to the storage search key, the data from the disk data field is still transferred but is not entered into main storage because the key being sought from the disk data field must already be stored in the scan field.

We claim:

1. In a computer system including main storage, a central processing unit, a disk storage drive, a disk storage drive attachment for connecting said disk storage drive to said central processing unit, the improvement comprising, means for reading bytes of data from a disk data field in said disk storage drive containing data to be entered into said main storage, means for reading bytes of data from a scan field in main storage having a search key with the remaining bytes therein set to a predetermined coded value distinguishable from said search key, compare means for comparing bytes of data read from said scan field with bytes of data read from said disk data field and indicating a compare condition, decoding means responsive to the first byte of said scan field having said predetermined coded value distinguishable from said search key for generating a mode switching signal, and means responsive to said mode switching signal and a compare condition for transferring bytes of data read from said disk data field to said scan field in main storage.

2. The computer system of claim 1 wherein said compare condition is a low compare condition.

3. The computer system of claim 1 where said scan field has a length one byte greater than the length of said disk data field.

4. The computer system of claim 1 where said search key is located at the head of said scan field.

5. The computer system of claim 1 wherein the bytes from said disk data field are transferred into said scan field to be separated from said search key therein by at least one byte having said predetermined coded value distinguishable from said search key.

6. The computer system of claim 1 wherein said predetermined coded value distinguishable from said search key is hexidecimal FF.

7. The computer system of claim 1 further comprising means responsive to said mode switching signal and a compare high condition for inhibiting the entry of bytes from said disk data field into said scan field.

8. In a computer system including a main storage for storing instructions and data, a central processing unit connected to said main storage for retrieving and storing instructions and data in said main storage and including means for executing said instructions and performing arithmetic and logic operations upon said data, a disk storage drive including disk media for storing data records on the surface thereof where said records include index records, each index record having a data field with at least one index key and an index key identification within said data field, a disk storage drive attachment connecting said disk storage drive to said central processing unit and operable in response to signals from said central processing unit and from said disk storage drive for controlling said disk storage drive in seek, read, write and scan modes, the improvement comprising scan field storage positions in main storage with a first group of storage positions thereof set to represent a search key and with the remaining storage positions of said scan field set to a predetermined coded value distinguishable from said search key, and means for performing a combined scan and read operation whereby said index key in said disk data field is scanned and compared with said search key in said scan field and upon detecting said storage positions set to said predetermined distinguishable coded value said index key identification is transferred into said remaining storage positions of said scan field.

9. The computer system of claim 8 wherein said search key is positioned at the head of said scan field.

10. The computer system of claim 8 wherein said means for performing a combined scan and read operation blocks entry of said disk data field into said scan field when said index key compares high to said search key.

11. In a computer system including a main storage for storing instructions and data, a central processing unit connected to said storage for retrieving and storing instructions and data in said main storage and including means for executing said instructions and performing arithmetic and logic operations upon said data, a disk storage drive including disk media for storing data records on the surface thereof where said records include index records, each index record having a data field with at least one index key and an index key identification within said data field, a disk storage drive attachment connecting said disk storage drive to said central processing unit and operable in response to signals from said central processing unit and from disk storage drive for controlling said disk storage drive in seek, read, write and scan modes, the improvement comprising a scan field storage positions in main storage with a first group of storage positions thereof set to represent search key at the head thereof and with the remaining storage positions of said scan field set to a predetermined coded value distinguishable from said search key, means in said disk storage drive attachment responsive to predetermined control signals from said central processing unit for initiating a scan and read operation control signal, selectively operable transfer means in said disk storage drive attachment for initiating sequential transfer of the contents of said scan field storage positions to said disk storage drive attachment and for simultaneously initiating sequential transfer of data from said disk data field, selectively operable comparing means responsive to said scan and read operation control signal for sequentially comparing the contents of sand scan field with the contents of said disk data field and providing compare low and compare high indications, decoding means connected to receive the sequential transferred contents of said scan field and responsive to detecting said coded value distinguishable from said search key for generating a switch mode signal, and means responsive to said switch mode signal for stopping said comparing means and for causing said selectively operable transfer means to discontinue transfer of the contents of said scan field and initiate sequential transfer of the remainder of data from said disk data field to said central processing unit for storage in said main storage within said remaining storage positions of said scan field.

12. The computer system of claim 11 wherein the remainder of said disk data field is stored in said scan field and separated from said search key by said coded value distinguishable from said search key.

13. The computer system of claim 11 further comprising means responsive to said switch mode signal and a compare high indication for generating a signal to inhibit the entry of the remainder of said disk data field into the scan field in main storage.

* * * * *

UNITED STATES PATENT OFFICE

CERTIFICATE OF CORRECTION

PATENT NO. : 3,848,235

DATED : November 12, 1974

INVENTOR(S) : David O. Lewis et al

It is certified that error appears in the above-identified patent and that said Letters Patent are hereby corrected as shown below:

Column 10, line 24, delete "sand" and insert --said--.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*